United States Patent Office 3,532,649
Patented Oct. 6, 1970

3,532,649
HEAT ACTIVATED CURING SYSTEM FOR
ORGANOSILICON COMPOUNDS
Schuyler B. Smith, Elizabethtown, Ky., and John P.
Snedeker, Midland, Mich., assignors to Dow Corning
Corporation, Midland, Mich., a corporation of Michigan
No Drawing. Continuation-in-part of application Ser. No.
696,687, Jan. 10, 1968. This application Sept. 13, 1968,
Ser. No. 759,788
Int. Cl. C08f 19/14
U.S. Cl. 260—18                    67 Claims

ABSTRACT OF THE DISCLOSURE

A curable organosilicon composition which is a mixture of an aliphatic unsaturated organosilicon polymer, an organosilicon compound containing silicon-bonded hydrogen atoms, a platinum catalyst and a metallic salt, including a stannous salt, a mercuric salt, a bismuth salt, a cupric salt, and a cuprous salt. The platinum catalyst is present in amount of at least 0.1 part per million parts of the organosilicon compounds and the metallic salt is present in amounts which effectively retard the cure at room temperature. The composition has increased stability at room temperature, but cures upon heating above 70° C.

---

This application is a continuation-in-part of application Ser. No. 696,687, filed Jan. 10, 1968 now abandoned.

This invention relates to a new heat activated curing system for organosilicon compounds.

Many articles of commerce based on organosilicon compounds are of the type that can be easily formed to a desired shape or applied to a desired area, after which the easily worked material is then cured to retain its desired configuration. For example, organopolysiloxane elastomers are normally supplied as formable materials ranging from thin pastes to stiff plastic dough-like materials. These materials are shaped by processes such as molding and extruding, after which the article is converted to the rubbery state by curing, a process often colled vulcanization when applied to an elastomer. The article then retains its desired shape, or if deformed, will seek to return to its vulcanized, or cured configuration. Similarly, polysiloxane resins, obtainable as fluids, fusible solids and solutions are also formed or applied and thereafter cured.

The curing methods employed for organosilicon compounds can be placed into two classes. The first are those that occur spontaneously at room temperature, exemplified by the curing systems such as described in U.S. Pats. 2,833,742, 2,843,555, 2,902,467, 2,934,519 and 2,999,077. The second are those that require heat to activate the curing reaction, such as organic peroxides, and the various sulfur-type cures more commonly used in connection with organic rubber. The instant composition is of the latter type; that is, it is heat activated. The present system is similar to the curing system described in U.S. Pat. No. 3,020,260, but differs therefrom in that the instant system is inactive at room temperature.

It is an object of the present invention to provide a novel useful heat activated curing system for organosilicon compounds.

Another object is to provide a curing system that can be incorporated into an organosilicon compound and that is inert at normal temperatures, but cures upon heating. Still another object is to provide a system which has a slow rate of cure at room temperature.

A further object is to provide a curing system that is not inhibited by air or components of air.

A further object is to provide a heat activated cure for organosilicon compounds that imparts good stability to the cured system.

These and other objects will be apparent from the following detailed description.

The present invention relates to a curable organosilicon composition comprising (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valence of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms, (2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation, and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radiacls, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) is at least 4, (3) a platinum catalyst in an amount of at least 0.1 part by weight platinum per million parts by weight of the combined weights of (1) and (2), and (4) a metallic salt in an amount such that the metallic atom is present in an amount effectively retarding the cure at room temperature, said metallic atom being selected from the group consisting of stannous, mercuric, bismuth (+3), cuprous and cupric.

Organosilicon compound (1) can be a resin, a fluid or a substantially non-flowing high polymer such as conventionally used in silicone rubber manufacture. Any monovalent hydrocarbon radical, halohydrocarbon radical or cyanoalkyl radical that can be used with organosilicon compounds as stated above is operable in component (1). Examples of monovalent hydrocarbon radicals that can be used include, for example, alkyl radicals such as methyl, ethyl, isopropyl, tert-butyl, octadecyl and myricyl; cycloalkyl radicals such as cyclopentyl and cyclohexyl; aralkyl radicals such as benzyl and 2-phenylethyl; aryl radicals such as phenyl, tolyl, xylyl, naphthyl, xenyl and anthracyl; and radicals containing aliphatic unsaturation such as vinyl, allyl, methallyl ethynyl, butadienyl, cyclopentenyl, m-vinylphenyl and the like.

Any monovalent halohydrocarbon radical and cyanoalkyl radical can be used in (1), and include, for example, chloromethyl, 3,3,3-trifluoropropyl, 2,3-dibromo-2-cyanopropyl, and omega-cyanooctadecyl.

In component (1) there must be an average per molecule of at least two radicals containing aliphatic unsaturation. These radicals enter into the curing reaction discussed below. More than two said radicals can be present, but a minimum of two (average per molecule) is necessary to obtain a cure to a coherent solid. When the average number of aliphatically unsaturated radicals per molecule is more than two, a correspondingly tighter cure is obtained.

The monovalent organic radicals in (1) can be the same or different. In addition, the aliphatically unsaturated radicals can be the same or different. As well, organosilicon compound (1) can be a copolymer, mixture of copolymers, mixtures of monomers and polymers, mixtures of monomers and copolymers and the like.

The remaining valences of the silicon atoms in organosilicon compound (1) are satisfied by divalent oxygen, divalent hydrocarbon radicals, divalent hydrocarbon ether radicals and divalent haloarylene radicals. Any one or more of the said divalent linkages can be present in component (1).

Examples of divalent radicals that can be used in component (1) include, for example, hydrocarbon radicals such as

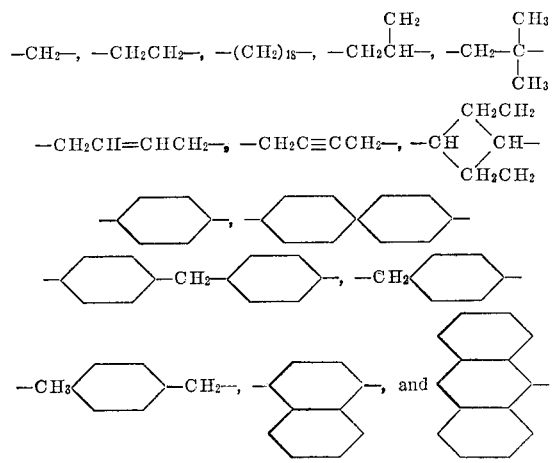

hydrocarbon ether radicals such as

—CH$_2$CH$_2$OCH$_2$CH$_2$—, —CH$_2$CH$_2$CH$_2$OCH$_2$CH$_2$— and

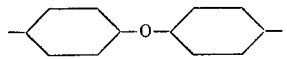

and haloarylene radicals such as

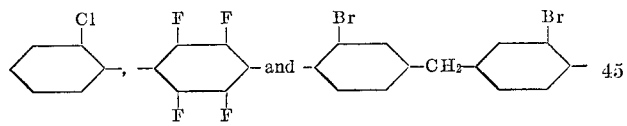

Any of the divalent linkages stated above can be present in component (1). However, where the average number of silicon atoms per molecule is greater than three, it is preferred when use of the finished product will include both extremely high and extremely low temperature exposure, that at least 50 percent of the divalent linkages be oxygen. This is not necessary, however, particularly when component (1) is a cyclic material.

Preparation of materials that can be component (1) are well known in the art. The monovalent radicals can be attached for instance, by either the so-called "direct process," or via Grignard reactions, or in some cases by a pseudo Friedel-Crafts reaction. Other reactions normally used to introduce organic radicals can, of course, be also used. Silicon-bonded oxygen is introduced by hydrolysis of a hydrolyzable group on silicon (such as halogen, alkoxy or acyloxy) as is well known in the art. Divalent organic radicals can be introduced via Wurtz-type synthesis, Grignard, direct process, etc. The preparations of compounds suitable for use as component (1) are well known in the art and need not be recited herein.

Organosilicon compound (2) can be any organosilicon compound having silicon bonded hydrogen atoms. It can contain two or more silicon-bonded hydrogen atoms per molecule and in addition an average of up to two monovalent radicals per silicon atom as above set forth. These can include, for example, alkyl radicals such as methyl, ethyl, isopropyl, tert-amyl, octadecyl and myricyl; cycloalkyl radicals such as cyclopentyl and cyclohexyl; aralkyl radicals such as benzyl, β-phenylethyl and xylyl; and aryl radicals such as phenyl, tolyl, xenyl, naphthyl and anthracyl. In addition, monovalent halohydrocarbon radicals such as chloromethyl, 3,3,3-trifluoropropyl, α,α,α-trifluorototolyl, bromophenyl and 2,3-dibromocyclopentyl can be present in component (2). Also, cyanoalkyl radicals such as cyanoethyl and cyanobutyl can also be present. The organic radicals can be alike or different. Component (2) can be a homopolymer, a copolymer, a monomer or mixture of two or more of the foregoing, provided only that each is free of aliphatic unsaturation and each contain an average per molecule of at least two silicon-bonded hydrogen atoms.

The remaining valences of the silicon atoms of component (2) are satisfied from divalent oxygen, divalent hydrocarbon radicals free of aliphatic unsaturation

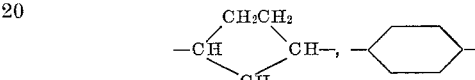

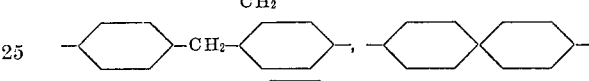

divalent hydrocarbon ether radicals free of aliphatic unsaturation (e.g.—CH$_2$CH$_2$OCH$_2$CH$_2$—, —CH$_2$CH$_2$CH$_2$OCH$_2$CH$_2$—

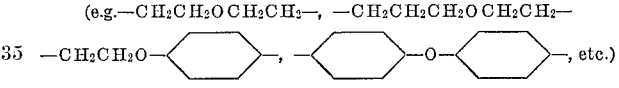

and divalent haloarylene radicals

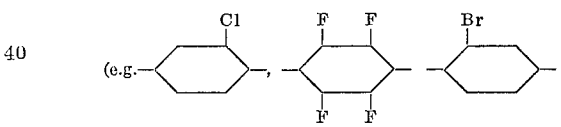

Anyone or more of the above said divalent linkages can be present in component (2). As with component (1), when the average number of silicon atoms per molecule of (2) is greater than three it is preferred that at least 50 percent of the above divalent linkages be oxygen. This is not necessary, however, especially when component (2) is a cyclic material.

Preparation of materials that come within the definition of component (2) are well known in the art, and many examples of such materials are available commercially. Thus, recitation of methods of manufacture of these materials would be redundant herein.

The selection of components (1) and (2) is somewhat interrelated. When the average number of aliphatically unsaturated groups per molecule in component (1) is 2.0, a component (2) should be selected wherein the average number of silicon-bonded hydrogen atoms per molecule is at least 2.0, so that the total of these just defined quantities is at least 4. The analogous is true when the chosen component (2) contains 2.0 (average) silicon-bonded hydrogen atoms per molecule. When either component has the defined quantity greater than 2.0, selection of the other component on this basis is irrelevant. It should be understood, of course, that the higher the sum of these quantities, the more highly crosslinked can be the cured composition.

The molar ratio of aliphatic unsaturated radicals in (1) to the silicon-bonded hydrogen atoms in (2) can in some cases be an important consideration. Where it is important, the ratio of these two should be preferably between 0.67 and 1.5. However, there are many instances wherein a balance of these two quantities is unimportant. For example, if a component (1) has, say, an average of six aliphatic unsaturated groups per molecule, the use of equal molar amounts of silicon-bonded hydrogen atoms may well give a cure too highly crosslinked for the desired end use. Thus, less than, sometimes much less than, the equal molar amount of SiH would be used to provide the desired degree of cure. However, when maximum stability is required it is desirable to match the molar quantities of silicon-bonded hydrogen atoms in (2) to the aliphatic unsaturated radicals in (1).

Platinum compound (3) can be any of the known forms, ranging from platinum as such or as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, on account of its easy dispersability in organosilicon systems and its non-effect on color of the mixture. Additional platinum compounds which include, $PtCl_2[P(CH_2CH_2CH_3)_3]_2$, platinum bromides, a complex of platinous halide and an olefin such as ethylene, propylene, butylene, cyclohexane and styrene,

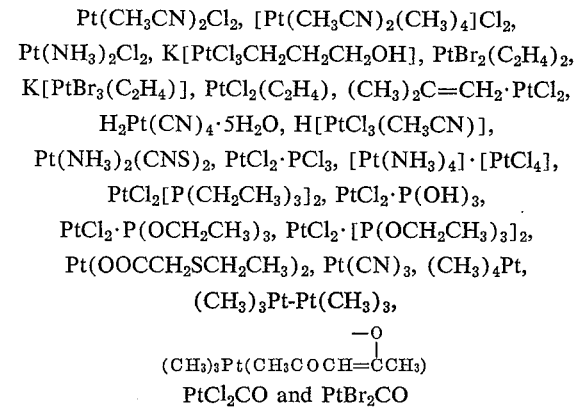

$PtCl_2CO$ and $PtBr_2CO$

There should be at least 0.1 part by weight platinum per million parts by weight of the combined total weight of (1) and (2). However, since impurities in the system may easily poison this small quantity of catalyst, it is preferred to employ from 1 to 20 parts per million of platinum. A greater amount of the platinum does not affect the reaction, but does affect the requirement of component (4) below, and economic considerations suggest the lower amounts mentioned.

The key component in the present curable organosilicon composition is the metallic atom or ion, stannous atom, mercuric atom, bismuth (+3) atom, cupric atom and cuprous atom. The metallic ion is present in the form of a metallic salt. The metallic salts include stannous salts, mercuric salts, bismuth (+3) salts, cupric salts and cuprous salts. The stannous salts are the preferred metallic salts.

Any of the stannous salts known in the art can be used to provide the stannous ion. Examples of stannous salts include among others, stannous chloride, stannous bromide, stannous iodide, stannous fluoride, stannous sulfide, stannous sulfate, stannous nitrate, and stannous salts of carboxylic acids such as stannous octoate, stannous stearate, stannous palimitate, stannous oleate, stannous ricinoleate, stanous naphthenate, stanous butyrate, stannous resinate, stannous linoleate, stannous acetate, stannous naphthanate, stannous laurate, stannous tallate, stannous benzoate, stannous phthalate, stannous citrate, stannous maleate, stannous propionate, stannous hexoate, stannous 2-ethyl-hexoate, stannous naphthoate, stannous succinate, stannous sebacate, stannous lactate, stannous crotonate, stannous salicylate, stannous mandelate, stannous cinnimate, stannous phenylacetate, stannous isobutyrate, stannous o-thymotate, stannous β-benzoyl-propionate, stannous tropate, stannous p-bromobenzoate and stannous palmitoleate.

Any of the mercuric salts known in the art can be used to provide the mercuric ion. Examples of mercuric salts include among others, mercuric chloride, mercuric bromide, mercuric fluoride, mercuric iodide, mercuric cyanide, mercuric nitrate, mercuric sulfate, mercuric acetate, mercuric benzoate, mercuric chlorate, mercuric oxolate, mercuric octoate, mercuric oleate, mercuric stearate, mercuric butyrate, mercuric laurate, mercuric citrate, mercuric hexoate, mercuric bromide chloride, mercuric madelate, mercuric p-bromobenzoate and mercuric salicylate.

Any of the bismuth (+3) salts known in the art can be used to provide the bismuth (+3) ion. Examples of bismuth (+3) salts include among others, bismuth trichloride, bismuth sulfate, bismuth acetate, bismuth benzoate, bismuth tribromide, bismuth citrate, bismuth nitrate, bismuth lactate, bismuth triiodide, bismuth oxalate, bismuth propionate, bismuth acetate chloride, bismuth naphthenate, bismuth gallate, bismuth formate, bismuth iodate, bismuth tartrate and bismuth salicylate.

Any of the cupric salts known in the art can be used to provide the cupric ion. Examples of cupric salts include cupric chloric, cupric acetate, cupric benzoate, cupric bromide, cupric metaborate, cupric butyrate, cupric chlorate, cupric perchlorate, cupric citrate, cupric ethylacetoacetate, cupric fluoride, cupric sulfide, cupric tartrate, cupric laurate, cupric lactate, cupric formate, cupric nitrate, cupric oxalate, cupric palmitate, cupric salicylate, cupric stearate, cupric xanthate, cupric sulfate, cupric octoate, cupric naphthenate, cupric linoleate, cupric succinate and cupric isobutyrate.

Any of the cuprous salts known in the art can be used to provide the cuprous ion. Examples of cuprous salts include, cuprous chloride, cuprous fluoride, cuprous bromide, cuprous iodide, cuprous sulfite, cuprous sulfate, cuprous octoate, cuprous palmitoleate, cuprous cinnamate, cuprous lactate, cuprous acetate, cuprous naphthoate, cuprous hexoate, cuprous benzoate, cuprous laurate and cuprous stearate.

The addition of the metallic salt to the present composition comprising (1), (2) and (3) slows down the rate of cure at room temperature or completely prevents a cure at room temperature over long periods of time such as greater than 3 months, but at temperatures in excess of 70° C. the inhibiting effect of the metallic salt observed at room temperature disappears and a normal curing rate is realized. The cure of the present composition can be retarded at room temperature for short periods of time or for very long periods of time by the proper amount of metallic ion. No exact amount of metallic ion can be suggested to give a specified storage life at room temperature. The rate of cure at temperatures up to 60° C. will depend upon the ratio of metallic ion to platinum, the form of the platinum catalyst, the nature of the metallic salt, the nature and amounts of ingredients (1) and (2) and the presence or absence of other non-essential ingredients. Metallic salts added in small amounts such as about 0.35 part by weight metallic ion per one part platinum provide increased pot life in all systems but, in most cases, do not fully retard the reaction at room temperature (up to about 60° C.) and in larger amounts such as about 40 parts by weight metallic ion per one part platinum they provide completely inhibited cures in all systems at room temperature (up to about 60° C.). However, some systems are completely inhibited at room temperature at 1 part by weight metallic ion per one part by weight platinum while others may require 2, 3 or 5 parts by weight metallic ion per one part by weight of platinum to completely inhibit the system at room temperature. Also some systems are not completely inhibited at room temperature when 1, 2, 3 or 5 parts by weight of metallic ion per one part by weight platinum is added. The amount of metallic ion is therefore dependent upon the desired use, and the nature of the system. The skilled worker should therefore determine the optimum level of each system.

The amount of metallic ion present is based on the amount of platinum. A suggested lower amount of metallic ion in the composition is about 0.35 part by weight metallic ion per one part by weight of platinum to provide a useful slowing down of the rate of cure at room temperature. Amounts less than 0.35 part by weight metallic ion per one part by weight of platinum can be used, however, depending upon the composition more or less can be used to provide a significant increase in the pot life of the composition at room temperature. Larger amounts, 40 to 75 parts or more by weight metallic ion per one part by weight of platinum can be used to completely inhibit the cure at room temperature over long periods of time. When large amounts of metallic ion are used, 40 to 75 parts by weight, the particular composition becomes important. In some cases 40 parts may be recommended as a maximum, because a slower cure at temperatures aboxe 70° C. is observed, whereas in other systems up to 75 parts metallic ion can be used without difficulty and can be recommended. A suggested range of the amount of metallic ion is from 0.35 to 75 parts by weight per one part by weight of platinum. The preferred range is from 1 to 60 parts by weight of metallic ion per one part by weight of platinum. It should be remembered, however, that these ranges are not definite for each particular composition.

As shown above, the use of a metallic salt can completely prevent room temperature cure of the present organosilicon composition or the metallic salt can be used to slow down the rate of cure at room temperature. Slowing down the rate of cure at room temperature can be extremely useful such as wherein a particular combination of (1), (2) and (3) would cure in four hours at room temperature, the same combination with the proper amount of metallic salt would require 24 hours to cure. This extra time before cure would allow the user a longer time to use the mixture for coating, dipping, etc., before any of the mixture cured. The inhibiting effect can be negated by heating the composition above 70° C. whereby the composition cures. Thus, the metallic salt, which is the key ingredient of this invention, can be used to retard the room temperature cure or prevent the room temperature cure (infinite retardation) of a system which cures by the platinum catalyzed interaction of silicon-bonded hydrogen atoms with unsaturated aliphatic radicals on silicon. It is preferred to use the stannous ion when the curable organosilicon composition is to be stored over long periods of time.

The components of this invention can be mixed in any order. While the addition of the platinum without the metallic salt will cause the beginning of interaction of components (1) and (2), the extent of reaction in a few minutes time at ordinary temperatures is negligible, within which time the metallic salt will normally have been added. In systems where even this small amount of interaction might be deleterious, the metallic salt can be added before the platinum. One method of mixing is to premix components (1) and (3), premix components (2) and (4), and then combine these two mixtures. Another method is to add the metallic salt to component (1) and (2) and then add (3). A preferred method of mixing the ingredients is to mix (3) and (4), particularly where (4) is a stannous salt. The resulting mixture of (3) and (4) provides a suitable catalyst mixture which can be stored and also added to either (1) or (2) or a mixture of (1) and (2) without any disadvantages. The advantages of mixing (3) and (4) are that the metallic salt and the platinum catalyst are in intimate contact and the full effect of the retardation of the effectiveness of the platinum catalyst is realized, that the ratio of (3) and (4) can be easily regulated, that since (3) and (4) are added in small amounts, the mixture can be more easily measured to provide greater accuracy in the amounts added, that many batches can be catalyzed exactly alike and that such a mixture is more easily adapted to a continuous process. Mixtures of (3) and (4) should be stored in the absence of heat, inasmuch as heat activates the system, and also in the absence of air. However, a set order of addition of the ingredient is not necessary to the functioning of this curing system.

The system can be mixed just prior to use (contemplated cure) or can be mixed and stored for later use. For best results, the compositions of the present invention should not be stored in glass containers or in contact with glass. In addition, one or more of the components can be omitted, provided only that when components (1), (2) and (3) are present, component (4) must also be present. In addition, the storage of a mixture of components (2) and (3) alone is not preferred, for should moisture be present or be introduced, an undesirable alternate reaction can occur. Thus, components (1), (2) and (4) can be stored together and component (3) added later, or (1), (3) and (4) to which (2) is added later, etc. Further, components (2), (3) and (4) can be conveniently stored together and added component (1) when desired. Such a system is especially desirable in the silicone rubber field, wherein the diorganopolysiloxane polymers each have essentially the same amount of aliphatic unsaturation, wherefore the addition of components (2), (3) and (4) as a premixture is quite feasible.

As stated earlier, with sufficient metallic salt the curing system is stable; that is, it does not cause curing of the organosilicon composition, at ordinary temperatures. For instance, even at 49° C. (120° F.) a fluid composition corresponding to the instant invention with sufficient stannous salt showed essentially no change in viscosity after 4 days. At 70° C., however, this same mixture was a vulcanized rubber after 24 hours, and at 150° C. it vulcanized within 10 minutes. Thus, the instant curing system is quite stable to about 50 to 60° C., well above ordinary temperatures.

The curing reaction is that of addition of an SiH of (2) to an unsaturated radical on silicon of (1). This is a well-known reaction, catalyzed by many other materials in addition to platinum. The addition of SiH to allyl on silicon serves to illustrate the reaction as follows:

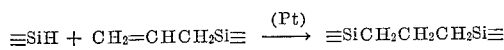

It is noteworthy that no by-products are formed in the curing reaction. Thus, it is not necessary to cure the system under pressure as is the case when a curing system produces by-products which are volatile. Further, it is unnecessary to carefully postbake the cured composition, as is necessary with most other heat activated curing systems now used in silicones. It is already well known that a curing system involving SiH and aliphatic unsaturated radicals need not be employed in a closed system. It is also well recognized that neither the extent of cure nor rate of cure are inhibited by air or components thereof.

In addition to the recited components, other materials can be present in a composition utilizing this curing catalyst system. Such materials as are ordinarily used in organosilicon compositions, such as filler, (5), (carbon black, silica aerogels, silica soots, treated silicas, alumina, clays, metal oxides, metal carbonates, metal silicates, etc.), pigments to impart certain colors to the material, rubber additives such as compression set aids, plasticizers (both organosilicon and organic), etc., can be added to the instant composition. Materials that are known to poison platinum catalysts should of course be excluded, but these are not normally included in organosilicon compounds designed to be cured by heat activated curing catalysts.

The instant composition can be used for any application requiring a resin or rubber where heat activated curing is possible. One will immediately recognize the tremendously wide variety of applications herein included. The instant curing system can be activated in closed or open systems, in thin or thick sections and under pressure and at atmospheric pressure with equal ease merely by the application of heat above about 70° C., there being complete freedom from the undesirable sponging associated with some curing systems when pressure is not used, and freedom from uncured surface, obtained particularly with organic peroxides, when the composition is cured in the open exposed to the atmosphere. Thus, advantages of this particular system include excellent thick-section cure, absence of air-inhibition, and therefore uniform cure throughout the sample. In addition, where desired, the system can serve to control (slow down) the rate of cure of a platinum catalyzed SiH—unsaturated aliphatic-on-silicon room temperature cure.

Particularly useful curable organosilicon compositions for many of the above uses are those having 45 to 75 inclusive weight percent of (1), 0.5 to 10 inclusive weight percent of (2), 20 to 50 inclusive weight percent of a filler, (5), where the weight percentages are based on the combined weights of (1), (2) and (5), and the described amounts of platinum catalyst and stannous salt.

The following examples are illustrative only and should not be construed as limiting the invention which is properly delineated in the appended claims.

EXAMPLE 1

A homogeneous mixture of 52.79 percent by weight of a methylphenylvinylsiloxy endblocked polydimethylsiloxane having a viscosity of about 2000 cp. at 25° C., 44.67 percent by weight 5 micron quartz, 0.45 percent by weight zinc oxide, 1.11 percent by weight iron oxide, 0.97 weight percent of a polysiloxane copolymer consisting of 19 mol per cent dimethylhydrogensiloxane units, 1.0 mol percent trimethylsiloxane units, 49 mol percent dimethylsiloxane units and 31 mol percent methylhydrogensiloxane units and 1.5 parts by weight platinum per million parts by weight of composition, the platinum having been added in the form of chloroplatinic acid, was prepared. To each 440 g. portion of the above mixture varying amounts of stannous ion were added in the form of stannous octoate, as indicated in the following table.

Sample: Stannous ion, g.
A _____ 0.002
B _____ 0.006
C _____ 0.006
D _____ 0.008
E _____ 0.010

To each of the above mixtures, 44 g. of a mixture of 77 weight percent of the methylphenylvinylsiloxy endblocked polydimethylsiloxane described above, 15 weight percent of the polysiloxane copolymer described above and 8 parts by weight iron oxide was mixed. Each sample was placed in a closed container at room temperature and the time for each to cure was observed. The time in which each cured to a rubber is indicated in the following table.

Sample: Cure time, days
A _____ 7
B _____ 8
C _____ 9
D _____ 10
E _____ 12

EXAMPLE 2

A mixture of 47.62 weight percent of the methylphenylvinylsiloxy endblocked polydimethylsiloxane as described in Example 1, 47.62 weight percent 5 micron quartz, 3.81 weight percent titanium dioxide, 0.95 weight percent zinc oxide and 10.5 parts by weight platinum per million parts by weight mixture, the platinum having been added as chloroplatinic acid was prepared. To each of eight 200 g. samples, a varying amount of stannous ion was added in the form of stannous octoate. The amounts of stannous ion are shown in the following table.

Sample: Stannous ion, g.
A _____ 0.000
B _____ 0.004
C _____ 0.008
D _____ 0.012
E _____ 0.016
F _____ 0.020
G _____ 0.025
H _____ 0.029
I _____ 0.033

To each of the above sample, 20 g. of a mixture of 77 weight percent of the methylphenylvinylsiloxy endblocked polydimethylsiloxane as described in Example 1, 15 weight percent of the polysiloxane copolymer described in Example 1 and 8 weight percent iron oxide was added and mixed to a uniform consistency. Each sample was divided, one portion was left in an open container at room temperature while another was placed in a closed container at 70° C. In each case the length of time for each sample to cure to a rubber was observed. The results are indicated in the following table.

|  | Cure time, room temperature | Cure time, 70° C. | Cure at 150° C., min. |
|---|---|---|---|
| Sample: | | | |
| A | 1 hour | 0.5 hour | 1 |
| B | do | do | 1 |
| C | 21 hours | do | 2 |
| D | 3 days | 2 hours | 3 |
| E | 5 days | 3 hours | 3 |
| F | 12 days | 21 hours | 2 |
| G | 1 month | do | 3 |
| H | do | 2 days | 5 |
| I | 1 month, 3 days | 3 days | 6 |

EXAMPLE 3

The composition as prepared in Example 2 was prepared again but having the following variations. To 400 g. of the first mixture, the following stannous compounds were added in the amounts shown in the following table.

|  | Stannous compound | Stannous ion, g. |
|---|---|---|
| Sample: | | |
| A | Stannous oleate | 0.022 |
| B | Stannous chloride | 0.150 |
| C | Stannous naphthanate | 0.150 |

To the above mixture, 40 g. of the second mixture as described in Example 2 was added and mixed to form a uniform mixture. A 10 g. sample of each of the above compositions was placed in an open dish in a 150° C. oven and the length of time to cure to a rubber was observed. The remaining portions were left at room temperature and the length of time to cure to a rubber was observed. The results are shown in the following table.

|  | Cure at 150° C., min. | Cure at room temperature |
|---|---|---|
| Sample: | | |
| A | 4 | >1 month. |
| B | 5 | Do. |
| C | 4 | Do. |

EXAMPLE 4

A mixture of chloroplatinic acid and stannous octoate was prepared such that there was 0.0277 g. of platinum and 0.332 g. of stannous ion. The mixture contained 0.0582 g. of chloroplatinic acid and 1.133 g. of stannous octoate.

A siloxane mixture was prepared which contained 72.4 weight percent of the methylphenylvinylsiloxy endblocked polydimethylsiloxane described in Example 1 and 27.6 weight percent of a trimethylsiloxy treated reinforcing silica. To 290 g. of the siloxane mixture, 0.0361 g. of the chloroplatinic acid-stannous octoate mixture was added and thoroughly mixed. A uniform mixture of the above mixture with 29 g. of a mixture of 87.82 weight percent of the methylphenylvinylsiloxy endblocked polydimethylsiloxane described in Example 1, 11.98 weight percent of the polysiloxane copolymer described in Example 1. The initial viscosity was 572 poise at 25° C. (Brookfield, spindle No. 6, 5 r.p.m.) and the viscosity after one day at room temperature was 580 poise at 25° C. The mixture cured to a rubber after a month at room temperature.

EXAMPLE 5

(A) The following silicone composition was used as a rubber base:

60.94 weight percent of the methylphenylvinylsiloxy endblocked polydimethylsiloxane described in Example 1, 26.42 weight percent of a trimethylsiloxy treated reinforcing silica, 9.26 weight percent methylphenylvinylsiloxy endblocked polydimethylsiloxane having a viscosity of 500 centistokes at 25° C., 1.13 weight percent zinc oxide and 2.25 weight percent titanium dioxide.

380 g. of the above silicone composition and 0.143 g. of the chloroplatinic acid-stannous octoate mixture of Example 4 were thoroughly mixed and then 38 g. of a mixture of 22.75 weight percent of a benzene soluble resin consisting of vinyldimethylsiloxane units, trimethylsiloxane units and $SiO_2$ units, 42.75 weight percent of the methylphenylvinylsiloxy endblocked polydimethylsiloxane described in Example 1 and 35.00 weight percent of the polysiloxane copolymer described in Example 1 was thoroughly mixed with the composition.

(B) The above procedure was repeated except only 0.040 g. of the chloroplatinic acid-stannous octoate mixture was used.

Sample B cured to a rubber in 4 days at room temperature and in 3 minutes at 150° C. Sample A required more than 4 days at room temperature to cure to a rubber.

The Sample B rubber, cured for 1 hour at 150° C., had a durometer of 35 on the Shore scale, an elongation of 400 percent, a tensile strength at break of 745 p.s.i., and a die "B" tear strength of 92 p.p.i.

cosity of the composition was 112 poise at 25° C. (Brookfield, spindle No. 4, 5 r.p.m.). A sample cured to a rubber with a durometer of 36 on the Shore scale in 4 minutes at 150° C. After 3 weeks at room temperature the viscosity of the uncured composition was 108 poise at 25° C. and a sample cured to a rubber with a durometer of 35 on the Shore scale in 4 minutes at 150° C.

EXAMPLE 7

A silicone rubber composition was prepared by thoroughly mixing 9,346.9 g. of the methylphenylvinylsiloxy endblocked polydimethylsiloxane described in Example 1, 136.2 g. of the polysiloxane copolymer described in Example 1, 8,647.6 g. of 5 micron quartz, 691.7 g. of titanium dioxide, 177.3 g. of zinc oxide, 72.6 g. of iron oxide, 1.999 g. of stannous octoate and 0.367 g. of chloroplatinic acid. The initial viscosity of the composition was 104 poise at 25° C. The composition cured in 4 minutes at 150° C. and the resulting silicone rubber had a durometer of 37 on the Shore scale. The viscosity of the silicone rubber composition after being stored for one month at room temperature was 98 poise at 25° C. The stored composition cured in 4 minutes at 150° C. to a silicone rubber having durometer of 35 on the Shore scale.

EXAMPLE 8

A silicone rubber composition as described in Example 2 was prepared. Several samples were prepared with various amounts of stannous octoate-chloroplatinic acid mixtures as shown in the following table. The indicated amount of stannous octoate-chloroplatinic acid mixture was added and thoroughly mixed into 360 g. of the first mixture described in Example 2. To the resulting mixture, 63 g. of the second mixture described in Example 2 was added and thoroughly mixed. Each sample was divided into 3 portions, 2 portions of 330 grams each and the remainder in a third portion. The viscosity of each of the samples was determined on a 330 g. portion and the viscosity of each sample was observed thereafter at periodic intervals until gellation occurred, the composition being at room temperature and viscosity measurement being made at 25° C. The other 330 g. portion was placed in a sealed container and the curing properties were observed after 3 months. The third portion was used to determine the rate of cure at 150° C. The results are shown in the following table.

| Sample No. | Stannous octoate, g. | Chloroplatinic acid, g. | Initial viscosity, poise | Viscosity after 7 days, poise | Viscosity after 14 days, poise | Viscosity after 28 days, poise | Viscosity after 42 days, poise | Viscosity after 56 days, poise | Viscosity after 63 days, poise |
|---|---|---|---|---|---|---|---|---|---|
| 1 | 0.03230 | 0.01333 | 120 | (¹) | | | | | |
| 2 | 0.03998 | 0.01321 | 104 | (¹) | | | | | |
| 3 | 0.04752 | 0.01308 | 112 | | (²) | | | | |
| 4 | 0.05493 | 0.01296 | 116 | 100 | 106 | 127.8 | 154.0 | 245.6 | 292 |
| 5 | 0.05859 | 0.01290 | 116 | 100 | 102 | 108 | 116 | 138.4 | 140 |
| 6 | 0.06219 | 0.01284 | 120 | 98.4 | 96 | 92.8 | 92.0 | 96.0 | 94.4 |
| 7 | 0.06576 | 0.01278 | 116 | 94.4 | 99 | 93.6 | 100 | 116 | 108 |
| 8 | 0.06930 | 0.01272 | 116 | 94.4 | 100 | 93.6 | 92 | 92 | 91.2 |

| Sample No. | Viscosity after 70 days, poise | Viscosity after 77 days, poise | Viscosity after 84 days, poise | Viscosity after 4 months, poise | Cure at 150° C. initial, minutes | Cure at 150° C. after 3 mo., minutes | Based on total composition | | |
|---|---|---|---|---|---|---|---|---|---|
| | | | | | | | Sn, p.p.m. | Pt. p.p.m. | Sn/Pt |
| 1 | | | | | 3 | | 13.7 | 9.16 | 1.50 |
| 2 | | | | | 3 | | 16.9 | 9.07 | 1.86 |
| 3 | | | | | 3 | | 20.1 | 8.98 | 2.24 |
| 4 | 404 | 636.8 | (²) | | 5 | | 23.2 | 8.90 | 2.61 |
| 5 | 168 | 196 | 254.4 | | 4 | 5.5 | 24.8 | 8.86 | 2.80 |
| 6 | 120 | 129.6 | 144 | 288.0 | 3 | 5.5 | 26.3 | 8.82 | 2.98 |
| 7 | 97.6 | 101.6 | 108 | 144.0 | 5.5 | 5.5 | 27.8 | 8.78 | 3.17 |
| 8 | 92.8 | 95.2 | 100 | 124.0 | 5.5 | 5.5 | 29.3 | 8.74 | 3.35 |

¹ Cured, 4 days.
² Cured.

EXAMPLE 6

A composition was prepared as described in Example 2, except 0.00187 g. of chloroplatinic acid and 0.01063 g. of stannous octoate were used per 100 grams of the first mixture as described in Example 2. The initial vis-

EXAMPLE 9

(A) A silicone rubber composition was prepared by milling on a rubber mill, 25 parts by weight of a dimethylvinylsiloxy endblocked polydimethylsiloxane gum, 75 parts by weight of a dimethylvinylsiloxy endblocked polydiorganosiloxane gum containing 99.858 mol percent dimethylsiloxane units and 0.142 mol percent methylvinylsiloxane units, 50 parts by weight trimethylsiloxy treated fume silica. The mixture was heated for 3 hours at 177° C. and then 160 parts by weight stannous ion per million parts by weight siloxane polymer were added in the form of stannous octoate. Thereafter, 1.5 parts by weight of a copolymer having dimethylhydrogensiloxy endblocking and an average of 3 units of methylhydrogensiloxane and an average of 5 units of dimethylsiloxane in the polymer chain, 10 parts by weight of zinc oxide and 50 parts by weight of platinum per million parts by weight of siloxane polymer were added and milled.

(B) The above composition was prepared as described above except that stannous octoate was omitted.

The plasticity was observed on the above samples and at various intervals while the compositions were stored at room temperature.

WILLIAMS PLASTICITY

| Sample: | Initial | After 1 day | After 11 days | After 19 days |
|---|---|---|---|---|
| A | 0.102 | 0.127 | 0.142 | 0.142 |
| B | 0.105 | Cured | | |

NOTE.—Sample A was vulcanized by heating at 250° C. for 24 hours, the silicone rubber obtained had a durometer of 52 on the Shore scale, 1,310 p.s.i. tensile strength at break, 460 percent elongation at break, and 176 p.p.i. "Die B" tear strength.

EXAMPLE 10

When two siloxane mixtures are prepared having the following composition

Siloxane A 100 parts by weight of a dimethylvinylsiloxy-endblocked dimethylpolysiloxane having a viscosity of 2,500 cs. at 25° C.,
30 parts by weight of calcined diatomaceous earth,
25 parts by weight of fine particle size zirconium silicate,
1 part by weight of butylcarbitol acetate containing 0.19 percent platinum as chloroplatinic acid.

Siloxane B 100 parts by weight of the same dimethylpolysiloxane as in A above,
120 parts by weight of calcined diatomaceous earth,
25 parts by weight of fine particle size zirconium silicate,
40 parts by weight of a mixture of iron oxide in a hydroxylated low viscosity dimethylpolysiloxane, there being 10 percent by weight of iron in the mixture,
59.5 parts by weight of a trimethylsiloxy-endblocked methylhydrogenpolysiloxane having an average per molecule of 10 silicon atoms, and when 100 parts by weight of siloxane A and 4 parts by weight of siloxane B are mixed the mixture gels in 1.5 hours and cures to a rubber in 24 hours.

When 100 parts by weight of siloxane A, 4 parts by weight of siloxane B and 0.0005 part by weight stannous ion added as stannous octoate are mixed, the mixture remains fluid for more than two weeks, but cures to a rubber in 15 minutes when heated to 150° C.

EXAMPLE 11

When a siloxane mixture is prepared of the following composition:
100 parts by weight of a vinyldimethylsiloxy-endblocked dimethylpolysiloxane having a viscosity of 2,500 cs. at 25° C.,
80 parts by weight of ground quartz having an average particle size of 5 microns,
1 part by weight of butyl carbitol acetate containing 0.19 percent platinum as chloroplatinic acid, and when 100 parts by weight of the above siloxane mixture and 4 parts by weight of siloxane B shown in Example 10 are mixed, the mixture cures at room temperature to a silicone rubber in 4 hours.

When 97 parts by weight of the above siloxane mixture, 3 parts by weight of a paste containing 50 percent by weight of a dimethylpolysiloxane having a viscosity of 100 cs. at 25° C. and 50 percent by weight of zinc oxide, 4 parts by weight of siloxane B shown in Example 10, and 0.002 parts by weight stannous ion added as stannous octoate are mixed, the mixture does not cure to a silicone rubber in 24 hours at room temperature.

EXAMPLE 12

Equivalent results are obtained when powdered platinum metal or platinum supported on gamma-alumina are substituted in equivalent amount for the butyl carbitol acetate solution of chloroplatinic acid in Example 10.

EXAMPLE 13

When 100 parts by weight of siloxane A of Example 10, except 2-ethylhexanol, replaces the butyl carbitol acetate in chloroplatinic acid solution and 4 parts by weight of siloxane B (per Example 10) are mixed, the composition becomes too thick to use in 20 minutes at room temperature.

When 100 parts by weight of siloxane A of Example 10, except 2-ethylhexanol, replaces the butyl carbitol acetate in the chloroplatinic acid solution 4 parts by weight of siloxane B as described in Example 10 and 0.0005 part by weight stannous ion added as a 50 weight percent stannous octoate and 50 weight percent of a dimethylvinylsiloxy endblocked dimethyl polysiloxane having a viscosity of 2,500 cs. at 25° C., the composition remains fluid for more than 2 weeks.

EXAMPLE 14

When any of the following polysiloxanes are substituted for the dimethylpolysiloxane in siloxane A in Example 10 and the mixtures made by mixing 100 parts by weight of siloxane A, 4 parts by weight siloxane B and 0.0005 part by weight stannous ion added as stannous octoate, the mixtures do not vulcanize at room temperature over extended periods of time.

(a) A methylphenylallylsiloxy-endblocked methyl-3,3,3-trifluoropropylpolysiloxane having a viscosity of 50,000 cs. at 25° C.

(b) A dimethylcyclopentenylsiloxy-endblocked copolymer containing about 50 mol percent ethylmethylsiloxane units, 5 mol percent octadecylmethylsiloxane units, 20 mol percent 2-phenylethylmethylsiloxane units and 25 mol percent units of the formula

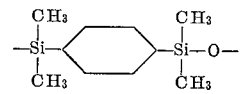

and having a viscosity of 250,000 cs. at 25° C.

(c) A mixture of (1) 10 parts of a 2-butynyldimethylsiloxy endblocked β-cyanoethylmethylsiloxane fluid having a viscosity of 700 cs. at 25° C. and (2) 90 parts of a hydroxy endblocked copolymer containing 98 mol percent chlorophenylmethylsiloxane units and 2 mol percent vinylethylsiloxane units, having a viscosity of 550 cs. at 25° C.

(d) A vinyldimethylsiloxy-endblocked copolymer containing 70 mol percent dimethylsiloxane units, 10 mol percent diphenylsiloxane units, 5 mol percent benzylmethylsiloxane units and 15 mol percent units of the formula

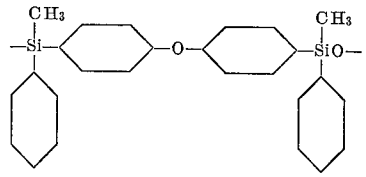

and having a viscosity of 25,000,000 cs. at 25° C.

(e) A copolymer containing 89.86 mol percent dimethylsiloxane units, 0.14 mol percent methylvinylsiloxane units and 10 mol percent units of the structure —(CH$_3$)$_2$SiCH$_2$Si(CH$_3$)$_2$O—, having a Williams plasticity of 0.100 inch.

(f) A copolymer containing dimethylvinylsiloxy endblocking and 3,3,3-trifluoropropylmethylsiloxane units having a viscosity of 10,000 cs. at 25° C.

EXAMPLE 15

When equivalent quantities of the following organosilicon compounds are substituted for the methylhydrogenpolysiloxane of siloxane B and the resulting mixture used as described in Example 14, similar results are obtained:

(a) 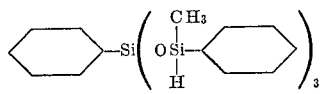

(b) 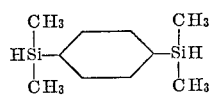

(c) 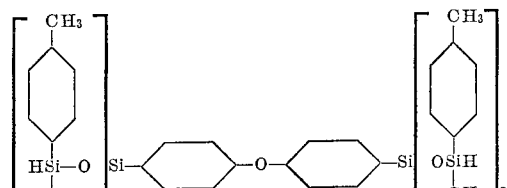

(d) 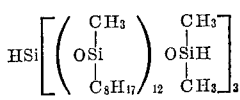

(e) A copolymer containing 40 mol percent of C$_6$H$_5$SiO$_{3/2}$ units, 40 mol percent cyclohexylmethylsiloxane units, 18 mol percent of 2-phenylpropylmethylsiloxane units, and 2 mol percent of methylhydrogensiloxane units having a viscosity of 500 cs. at 25° C.

(f) A mixture containing 10 parts of

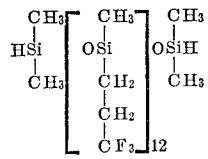

85 parts of

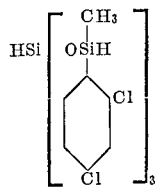

and 5 parts of

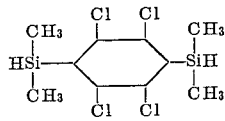

EXAMPLE 16

When 3 parts by weight stannous ion added as a stannous salt of a carboxylic acid, per one part by weight of platinum is added to the following mixture, the resulting composition is stable at ordinary temperatures, but can be cured to a coherent solid by heating at a temperature above 70° C. until the desired cure is obtained:

100 parts of a phenylmethylhydrogensiloxy-endblocked dimethylpolysiloxane having a viscosity of 100,000 cs. at 25° C., 2.0 parts of a fluid copolymer of the average composition

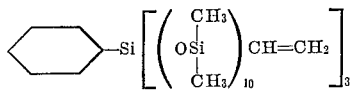

0.0002 part of platinum added as a solution of platinum sulfate in ethanol.

EXAMPLE 17

When 1 part by weight stannous ion added as a stannous bromide, per one part by weight of platinum is used in Example 16 instead of 3 parts by weight, the mixture does not cure in 8 hours at room temperature but cures when heated to 70° C. in less than an hour.

EXAMPLE 18

When 100 parts by weight of a dimethylvinylsiloxy endblocked dimethylpolysiloxane gum containing 0.142 mol percent methylvinylsiloxane units, 55 parts by weight of powdered silica having a surface area of 200 m.$^2$/g., 8 parts by weight of a hydroxylated dimethylpolysiloxane fluid, 5 parts by weight of diphenylsilanediol and 1 part by weight of a methylvinylpolysiloxane fluid are milled and heated for 3 hours at 177° C., an elastomer base is formed.

When 100 parts by weight of the above mixture, 5.55 parts by weight of hydrated alumina, 0.835 part by weight of a fluid copolymer consisting of 19 mol percent dimethylhydrogensiloxane units, 1 mol percent trimethylsiloxane units, 49 mol percent dimethylsiloxane units and 31 mol percent methylhydrogensiloxane units, 0.003 part by weight platinum added as chloroplatinic acid, 2.2 parts by weight of a vinylated organopolysiloxane and 0.01 part by weight stannous ion added as stannous octoate is mixed and dispersed in 430 parts by weight chlorothene and thereafter 5.4 parts by weight of a trimethylsiloxy endblocked polymethylhydrogensiloxane is added, a dispersion which remains uncured for more than a month at room temperature, but readily cures to a rubber when heated to 100° C. This composition is suitable for dip coating electrical equipment to provide insulation.

EXAMPLE 19

When any one of the following stannous salts are substituted for the stannous octoate of Example 2, equivalent results are obtained:

Stannous bromide
Stannous sulfate
Stannous stearate
Stannous ricinoleate
Stannous laurate
Stannous succinate
Stannous phenylacetate
Stannous acetate
Stannous isobutyrate
Stannous p-bromobenzoate

EXAMPLE 20

When the following compositions are prepared by thoroughly mixing, the composition is stable at room temperature, but cures to a solid upon heating to 90° C.

(A)

45 parts by weight of a dimethylvinylsiloxy endblocked dimethylpolysiloxane gum
50 parts by weight of a silica filler
5 parts by weight of a trimethylsiloxy endblocked polymethylhydrogensiloxane fluid having a viscosity of 60 cs. at 25° C.
0.0001 part by weight of platinum added as H$_2$Pt(CN)$_4$·5H$_2$O and
0.001 part by weight of stannous ion added in the form of stannous lactate.

(B)

49.5 parts by weight of a siloxane polymer having 45 mol percent dimethylsiloxane units, 2 mol percent monovinylsiloxane units, 31 mol percent phenylmethylsiloxane units, 20 mol percent benzylmethylsiloxane units and 2 mol percent monomethylsiloxane units, 0.5 part by weight of a compound of the formula

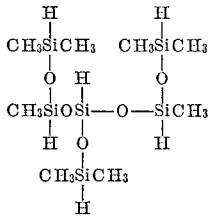

40 parts by weight of a fume silica,
10 parts by weight of finely divided quartz,
0.00025 part by weight platinum added as $Pt(NH_3)_2Cl_2$ and
0.005 part by weight stannous ion added as stannous benzoate.

(C)

75 parts by weight of a hydroxyl endblocked polydimethylsiloxane gum containing 0.2 mol percent methylvinylsiloxane units,
5 parts by weight of a tetramethyldihydrogendisiloxane
20 parts by weight of a silica treated with trimethylsiloxy groups,
0.0008 part by weight platinum added as $PtCl_2(C_2H_4)$ and
0.016 part by weight stannous ion added as stannous hexoate.

(D)

60 parts by weight of a dimethylvinylsiloxy endblocked polydiorganosiloxane having 60 mol percent dimethylsiloxane units, 35 mol percent cyclohexylmethylsiloxane units, 4 mol percent diphenylsiloxane units and 1 mol percent phenylvinylsiloxane units and having a viscosity of 50,000 cs. at 25° C.

30 parts by weight of a fume silica,
10 parts by weight of a polymer of the average formula $(CH_3)_3SiO([(CH_3)_2SiO]_{62}[(CH_3)HSiO]_8)Si(CH_3)_3$ 0.001 part by weight of platinum added as chloroplatinic acid, and
0.03 part by weight of stannous ion added as stannous salicylate.

(E)

50 parts by weight of a dimethylvinylsiloxy endblocked polydimethylsiloxane having a viscosity of 100 cs. at 25° C.,
25 parts by weight of finely divided quartz
6 parts by weight of

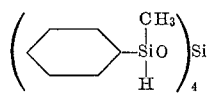

4 parts by weight of fume silica
0.0009 part by weight of platinum added as chloroplatinic acid, and
0.025 part by weight of stannous ion added as stannous octoate.

(F)

45 parts by weight of a dimethylvinylsiloxy endblocked dimethylpolysiloxane gum
50 parts by weight of a silica filler,
5 parts by weight of a trimethylsiloxy endblocked polymethylhydrogensiloxane fluid having a viscosity of 60 cs. at 25° C.,
0.00005 part by weight platinum added as chloroplatinic acid, and
0.00375 part by weight stannous ion added as stannous octoate.

(G)

45 parts by weight of a dimethylvinylsiloxy endblocked dimethylpolysiloxane gum
50 parts by weight of a silica filler
5 parts by weight of a trimethylsiloxy endblocked polymethylhydrogensiloxane fluid having a viscosity of 60 cs. at 25° C.
0.005 part by weight platinum added as chloroplatinic acid, and
0.030 part by weight stannous ion added as stannous octoate.

EXAMPLE 21

A homogeneous mixture of 43.64 percent by weight of a methylphenylvinylsiloxy endblocked polydimethylsiloxane having a viscosity of about 2000 cp. at 25° C., 43.64 percent by weight 5 micron quartz, 3.49 percent by weight titanium dioxide, 0.87 percent by weight zinc oxide, 6.98 percent by weight of a methylphenylvinylsiloxy endblocked polydimethylsiloxane having a viscosity of about 500 cs. at 25° C. and 1.38 percent by weight of a polysiloxane copolymer consisting of 19 mol percent dimethylhydrogensiloxane units, 1.0 mol percent trimethylsiloxane units, 49 mol percent dimethylsiloxane units, and 31 mol percent methylhydrogensiloxane units was prepared. A catalyst mixture consisting of 1 part by weight platinum as chloroplatinic acid and 20 parts by weight of a metallic ion as the metal chloride as indicated below was prepared.

| Catalyst mixture: | Metal chloride |
|---|---|
| A | $Cu_2Cl_2$ |
| B | $CuCl_2$ |
| C | $BiCl_3$ |
| D | $HgCl_2$ |
| E | $SnCl_2$ |
| F | None |

The six catalyst mixtures were each mixed with the homogeneous siloxane mixture in a ratio of 1 part by weight catalyst mixture to 230 parts by weight of the homogeneous siloxane mixture to provide six catalyzed systems.

The time for each mixture to form a gel was observed and was as indicated below:

| Catalyst mixture used: | Time to gel, hours |
|---|---|
| A | 8 |
| B | 16 |
| C | 96 |
| D | 16 |
| E | >504 |
| F | (*) |

*Gelled while mixing the catalyst with the homogenous siloxane mixture.

EXAMPLE 22

When the following compositions are prepared by thoroughly mixing, the time of curing at room temperature is increased, but the composition cures to a solid in a few minutes when heated to 90° C.

(A)

50 parts by weight of a dimethylvinylsiloxy endblocked polydimethylsiloxane having a viscosity of 100 cs. at 25° C.,
25 parts by weight of finely divided quartz
6 parts by weight of

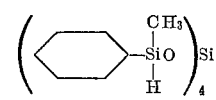

4 parts by weight of fume silica 0.0009 part by weight of platinum added as chloroplatinic acid, and 0.025 part by weight of cuprous ion added as cuprous acetate.

(B)

75 parts by weight of a hydroxyl endblocked polydimethylsiloxane gum containing 0.2 mol percent methylvinylsiloxane units, 5 parts by weight of a tetramethyldihydrogendisiloxane, 20 parts by weight of a silica treated with trimethylsiloxy groups, 0.0008 part by weight platinum added as $PtCl_2(C_2H_4)$ and 0.016 part by weight cupric ion added as cupric lactate.

(C)

45 parts by weight of a dimethylvinylsiloxy endblocked dimethylpolysiloxane gum, 50 parts by weight of a silica filler 5 parts by weight of a trimethylsiloxy endblocked polymethylhydrogensiloxane fluid having a viscosity of 60 cs. at 25° C.

0.0001 part by weight of platinum added as

$$H_2Pt(CN)_4 \cdot 5H_2O$$

and 0.001 part by weight of bismuth ion added in the form of bismuth nitrate.

(D)

60 parts by weight of a dimethylvinylsiloxy endblocked polydiorganosiloxane having 60 mol percent dimethylsiloxane units, 35 mol percent cyclohexylmethylsiloxane units, 4 mol percent diphenylsiloxane units and 1 mol percent phenylvinylsiloxane units and having a viscosity of 50,000 cs. at 25° C.

30 parts by weight of a fume silica, 10 parts by weight of a polymer of the average formula $$(CH_3)_3SiO[[(CH_3)_2SiO]_{62}[(CH_3)HSiO]_8)Si(CH_3)_3$$

0.001 part by weight of platinum added as chloroplatinic acid, and 0.03 part by weight of mercuric ion added as mercuric benzoate.

(E)

45 parts by weight of a dimethylvinylsiloxy endblocked dimethylpolysiloxane gum 50 parts by weight of a silica filler 5 parts by weight of a trimethylsiloxy endblocked polymethylhydrogensiloxane fluid having a viscosity of 60 cs. at 25° C.

0.0005 part by weight platinum added as chloroplatinic acid, and 0.030 part by weight mercuric ion added as mercuric laurate.

(F)

49.5 parts by weight of a siloxane polymer having 45 mol percent dimethylsiloxane units, 2 mol percent monovinylsiloxane units, 31 mol percent phenylmethylsiloxane units, 20 mol percent benzylmethylsiloxane units and 2 mol percent monomethylsiloxane units, 0.5 part by weight of a compound of the formula

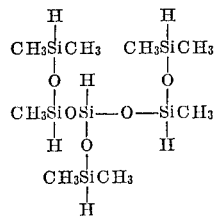

40 parts by weight of a fume silica, 10 parts by weight of finely divided quartz, 0.00025 part by weight platinum added as $Pt(NH_3)_2Cl_2$ and 0.005 part by weight bismuth ion added as bismuth benzoate.

(G)

45 parts by weight of a dimethylvinylsiloxy endblocked dimethylpolysiloxane gum 50 parts by weight of a silica filler 5 parts by weight of a trimethylsiloxy endblocked polymethylhydrogensiloxane fluid having a viscosity of 60 cs. at 25° C., 0.00005 part by weight platinum added as chloroplatinic acid, and 0.00375 part by weight cupric ion added as cupric naphthenate.

EXAMPLE 23

When a mixture of 47.62 weight percent of the methylphenylvinylsiloxy endblocked polydimethylsiloxane as described in Example 1, 47.62 weight percent 5 micron quartz, 3.81 weight percent titanium dioxide, 0.95 weight percent zinc oxide and 10.5 parts by weight platinum per million parts by weight mixture, the platinum having been added as chloroplatinic acid is prepared, and to each of eight 200 g. samples an amount of metallic ion is added in the form of a metallic salt as shown in the following table, the cure time increases to over one hour, at room temperature, but cures in a few minutes when heated to 125° C.

| Metallic salt: | Metallic ion, g. |
|---|---|
| Mercuric bromide | 0.005 |
| Mercuric octoate | 0.008 |
| Mercuric salicylate | 0.040 |
| Bismuth oxalate | 0.050 |
| Cupric acetate | 0.016 |
| Cupric sulfide | 0.025 |
| Cupric xanthate | 0.020 |
| Cuprous iodide | 0.030 |
| Cuprous benzoate | 0.010 |
| Stannous citrate | 0.015 |
| Mercuric sulfate | 0.042 |
| Mercuric citrate | 0.070 |
| Bismuth tribromide | 0.100 |

That which is claimed is:

1. A curable organosilicon composition comprising
(1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms,
(2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4, (3) a platinum catalyst in an amount of at least 0.1 part by weight platinum per million parts by weight of the combined weights of (1) and (2), and (4) a metallic salt in an amount such that the metallic atom is present in an amount effectively retarding the cure at room temperature, said metallic atom being selected from the group consisting of stannous, mercuric, bismuth (+3), cuprous and cupric.

2. The curable organosilicon composition according to claim 1 wherein (1) is a triorganosiloxy endblocked polydiorganosiloxane having a viscosity of at least 100 cs. at 25° C. and the aliphatic unsaturation is olefinic unsatuation.

3. The curable organosilicon composition according to claim 1 wherein the metallic atom is present in an amount of from 0.35 to 75 parts by weight per one part by weight of platinum.

4. The curable organosilicon composition according to claim 2 wherein the metallic atom is present in an amount of from 0.35 to 75 parts by weight per one part by weight of platinum.

5. The curable organosilicon composition according to claim 4 wherein the organic radicals of (1) are methyl and vinyl.

6. The curable organosilicon composition according to claim 4 wherein the organic radicals of (1) are methyl, phenyl and vinyl.

7. The curable organosilicon composition according to claim 4 wherein the organic radicals of (1) are methyl, vinyl and 3,3,3-trifluoropropyl.

8. The curable organosilicon composition according to claim 1 wherein the metallic atom of (4) is a stannous atom.

9. The curable organosilicon composition according to claim 8 wherein (4) is a stannous salt of a carboxylic acid.

10. The curable organosilicon composition according to claim 2 wherein (4) is a stannous salt of a carboxylic acid.

11. The curable organosilicon composition according to claim 3 wherein (4) is a stannous salt of a carboxylic acid.

12. The curable organosilicon composition according to claim 4 wherein (4) is a stannous salt of a carboxylic acid.

13. The curable organosilicon composition according to claim 9 wherein (4) is stannous octoate.

14. The curable organosilicon composition according to claim 10 wherein (4) is stannous octoate.

15. The curable organosilicon composition according to claim 11 wherein (4) is stannous octoate.

16. The curable organosilicon composition according to claim 10 wherein (3) is chloroplatinic acid.

17. The curable organosilicon composition according to claim 11 wherein (3) is chloroplatinic acid.

18. The curable organosilicon composition according to claim 14 wherein (3) is chloroplatinic acid.

19. The curable organosilicon composition according to claim 9 wherein (4) is stannous oleate.

20. The curable organosilicon composition according to claim 10 wherein (4) is stannous oleate.

21. The curable organosilicon composition according to claim 11 wherein (4) is stannous oleate.

22. The curable organosilicon composition according to claim 9 wherein (4) is stannous naphthanate.

23. The curable organosilicon composition according to claim 10 wherein (4) is stannous naphthanate.

24. The curable organosilicon composition according to claim 11 wherein (4) is stannous naphthanate.

25. The curable organosilicon composition according to claim 1 wherein (4) is stannous chloride.

26. The curable organosilicon composition according to claim 2 wherein (4) is stannous chloride.

27. The curable organosilicon composition according to claim 4 wherein (4) is stannous chloride.

28. The curable organosilicon composition according to claim 2 wherein (1) is present in an amount of from 45 to 75 inclusive weight percent based on the combined weight of (1), (2) and (5), (2) is present in an amount of from 0.5 to 10 inclusive weight percent based on the combined weight of (1), (2) and (5) and (5), a filler, is present in an amount of from 20 to 50 inclusive weight percent based on the weight of (1), (2) and (5).

29. The curable organosilicon composition according to claim 6 wherein (1) is present in an amount of from 45 to 75 inclusive weight percent based on the combined weight of (1), (2) and (5), (2) is present in an amount of from 0.5 to 10 inclusive weight percent based on the combined weight of (1), (2) and (5) and (5), a filler, is present in an amount of from 20 to 50 inclusive weight percent based on the weight of (1), (2) and (5).

30. The curable organosilicon composition according to claim 7 wherein (1) is present in an amount of from 45 to 75 inclusive weight percent based on the combined weight of (1), (2) and (5), (2) is present in an amount of from 0.5 to 10 inclusive weight percent based on the combined weight of (1), (2) and (5) and (5), a filler, is present in an amount of from 20 to 50 inclusive weight percent based on the combined weight of (1), (2) and (5).

31. The curable organosilicon composition according to claim 28 wherein (4) is a stannous salt of a carboxylic acid.

32. The curable organosilicon composition according to claim 31 wherein (3) is chloroplatinic acid.

33. The curable organosilicon composition according to claim 1 wherein the metallic atom of (4) is a bismuth (+3) atom.

34. The curable organosilicon composition according to claim 33 wherein (4) is $BiCl_3$.

35. The curable organosilicon composition according to claim 2 wherein the metallic atom of (4) is a bismuth (+3) atom.

36. The curable organosilicon composition according to claim 3 wherein the metallic atom of (4) is a bismuth (+3) atom.

37. The curable organosilicon composition according to claim 36 wherein (4) is $BiCl_3$.

38. The curable organosilicon composition according to claim 4 wherein the metallic atom of (4) is a bismuth (+3) atom.

39. The curable organosilicon composition according to claim 38 wherein (4) is $BiCl_3$.

40. The curable organosilicon composition according to claim 35 wherein (3) is chloroplatinic acid.

41. The curable organosilicon composition according to claim 35 wherein (1) is present in an amount of from 45 to 75 inclusive weight percent based on the combined weight of (1), (2) and (5), (2) is present in an amount of from 0.5 to 10 inclusive weight percent based on the combined weight of (1), (2) and (5) and (5), a filler, is present in an amount of from 20 to 50 inclusive weight percent based on the combined weight of (1), (2) and (5).

42. The curable organosilicon composition according to claim 1 wherein the metallic atom of (4) is a cupric atom.

43. The curable organosilicon composition according to claim 42 wherein (4) is cupric chloride.

44. The curable organosilicon composition according to claim 2 wherein the metallic atom of (4) is a cupric atom.

45. The curable organosilicon composition according to claim 3 wherein the metallic atom of (4) is a cupric atom.

46. The curable organosilicon composition according to claim 44 wherein (3) is chloroplatinic acid.

47. The curable organosilicon composition according to claim 44 wherein (1) is present in an amount of from 45 to 75 inclusive weight percent based on the combined weight of (1), (2) and (5), (2) is present in an amount of from 0.5 to 10 inclusive weight percent based on the combined weight of (1), (2) and (5) and (5), a filter, is present in an amount of from 20 to 50 inclusive weight percent based on the combined weight of (1), (2) and (5).

48. The curable organosilicon composition according to claim 1 wherein the metallic atom of (4) is a mercuric atom.

49. The curable organosilicon composition according to claim 48 wherein (4) is mercuric chloride.

50. The curable organosilicon composition according to claim 2 wherein the metallic atom of (4) is a mercuric atom.

51. The curable organosilicon composition according to claim 3 wherein the metallic atom of (4) is a mercuric atom.

52. The curable organosilicon composition according to claim 50 wherein (3) is chloroplatinic acid.

53. The curable organosilicon composition according to claim 50 wherein (1) is present in an amount of from 45 to 75 inclusive weight percent based on the combined weight of (1), (2) and (5), (2) is present in an amount of from 0.5 to 10 inclusive weight percent based on the combined weight of (1), (2) and (5) and (5), a filter, is present in an amount of from 20 to 50 inclusive weight percent based on the combined weight of (1), (2) and (5).

54. The curable organosilicon composition according to claim 1 wherein the metallic atom of (4) is a cuprous atom.

55. The curable organosilicon composition according to claim 54 wherein (4) is cuprous chloride.

56. The curable organosilicon composition according to claim 2 wherein the metallic atom of (4) is a cuprous atom.

57. The curable organosilicon composition according to claim 3 wherein the metallic atom of (4) is a cuprous atom.

58. The curable organosilicon composition according to claim 56 wherein (3) is chloroplatinic acid.

59. The curable organosilicon composition according to claim 56 wherein (1) is present in an amount of from 45 to 75 inclusive weight percent based on the combined weight of (1), (2) and (5), (2) is present in an amount of from 0.5 to 10 inclusive weight percent based on the combined weight of (1), (2) and (5) and (5), a filter, is present in an amount of from 20 to 50 inclusive weight percent based on the combined weight of (1), (2) and (5).

60. A method for curing an organosilicon composition comprising (A) mixing
 (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms,
 (2) an organosilicon compound containing silicon-bonded hydrogen atoms, there being in addition an average of up to two monovalent organic radicals per silicon atoms selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation divalent hydrocarbon ether radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4,
 (3) a platinum catalyst in an amount of at least 0.1 part by weight platinum per million parts by weight of the combined weights of (1) and (2), and
 (4) a metallic salt in an amount such that the metallic atom is present in an amount effectively retarding the cure at room temperature, said metallic atom being selected from the group consisting of stannous, mercuric, bismuth (+3), cuprous and cupric, and (B) heating the resulting mixture of (A), above 70° C., whereby a coherent solid is obtained.

61. The method for curing an organosilicon composition according to claim 60 wherein (1) is a triorganosiloxy endblocked polydiorganosiloxane having a viscosity of at least 100 cs. at 25° C.

62. A method for preparing a curable organosilicon composition comprising (C) mixing
 (3) a platinum catalyst in an amount of at least 0.1 part by weight platinum per million parts by weight of the combined weights of (1) and (2), and
 (4) a metallic salt in an amount such that the metallic atom is present in an amount effectively retarding the cure at room temperature, said metallic atom being selected from the group consisting of stannous, mercuric, bismuth (+3), cuprous and cupric, (D) mixing
 (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms
 (2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4.

(E) combining the resulting mixtures of (C) and (D) and thereafter thoroughly mixing whereby a homogeneous mixture is obtained.

63. The method for preparing a curable organosilicon composition in accordance with claim 62 wherein (3) is chloroplatinic acid and (4) is stannous octoate.

64. A heat activated catalytic composition consisting essentially of a mixture of (3) a platinum catalyst in an amount of at least 0.1 part by weight platinum per million parts by weight of the combined weights of (1) and (2), and (4) a stannous salt in an amount such that the stannous atom is present in an amount of from 0.35 to 75 parts by weight per one part by weight of platinum.

65. The heat activated catalytic composition according to claim 64 wherein (3) is chloroplantinic acid and (4) is stannous octoate.

66. The curable organosilicon composition according to claim 2 wherein (1) is a gum.

67. The curable organosilicon composition according to claim 66 wherein (3) is chloroplatinic acid and (4) is stannous octoate.

References Cited
UNITED STATES PATENTS

| | | | |
|---|---|---|---|
| 3,159,601 | 12/1964 | Ashby | 260—46.5 |
| 3,159,662 | 12/1964 | Ashby | 260—448.2 |
| 3,188,299 | 6/1965 | Chalk | 260—46.5 |
| 3,188,300 | 6/1965 | Chalk | 260—46.5 |
| 3,192,181 | 6/1965 | Moore | 260—46.5 |

DONALD E. CZAJA, Primary Examiner

M. I. MARQUIS, Assistant Examiner

U.S. Cl. X.R.

252—63.7, 430; 260—18, 37, 46.5, 825